US007950882B2

(12) United States Patent
Zaiser et al.

(10) Patent No.: US 7,950,882 B2
(45) Date of Patent: May 31, 2011

(54) ROUTER

(75) Inventors: Adolf Zaiser, Koengen (DE); Heiko Roehm, Stuttgart (DE); Jens Blum, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 882 days.

(21) Appl. No.: 11/929,010

(22) Filed: Oct. 30, 2007

(65) Prior Publication Data

US 2008/0149221 A1 Jun. 26, 2008

(30) Foreign Application Priority Data

Dec. 22, 2006 (DE) ......................... 10 2006 061 238

(51) Int. Cl.
*B23C 1/20* (2006.01)
*B27C 5/10* (2006.01)

(52) U.S. Cl. ......... 409/182; 409/210; 409/218; 409/184

(58) Field of Classification Search .................. 409/182, 409/180, 210, 214, 218, 184; 408/16, 241 S, 408/710; 144/136.95, 154.5
See application file for complete search history.

(56) References Cited

U.S. PATENT DOCUMENTS

| | | | | |
|---|---|---|---|---|
| 4,770,573 | A * | 9/1988 | Monobe | 409/182 |
| 5,094,575 | A * | 3/1992 | Kieser et al. | 409/182 |
| 5,191,921 | A * | 3/1993 | McCurry | 144/154.5 |
| 5,833,409 | A * | 11/1998 | Giacometti et al. | 409/182 |
| 6,139,229 | A | 10/2000 | Bosten et al. | |
| 6,474,378 | B1 * | 11/2002 | Ryan et al. | 144/154.5 |
| 6,488,455 | B1 | 12/2002 | Staebler et al. | |
| 6,619,894 | B2 | 9/2003 | Hathcock et al. | |
| 2005/0079025 | A1 | 4/2005 | Oberheim | |

FOREIGN PATENT DOCUMENTS

| | | |
|---|---|---|
| GB | 2 070 513 | 9/1981 |
| GB | 2 225 280 | 5/1990 |

* cited by examiner

*Primary Examiner* — Erica E Cadugan
(74) *Attorney, Agent, or Firm* — Michael J. Striker

(57) ABSTRACT

A router has a housing, from the underside of which a tool fitting for a milling tool connected with a drive motor extends and the housing is displaceably accommodated on guide columns for adjusting the milling depth, a device for adjusting the milling depth, which includes a depth adjusting element that is displaceable in the direction of a vertical axis of the router using an adjusting element and that interacts with a stop element, and a device for locking the depth adjusting element. The device for locking the depth adjusting element is integrated in the device for adjusting the milling depth.

12 Claims, 3 Drawing Sheets

ROUTER

CROSS-REFERENCE TO A RELATED APPLICATION

The invention described and claimed hereinbelow is also described in German Patent Application DE 102006061238.8 filed on Dec. 22, 2006. This German Patent Application, whose subject matter is incorporated here by reference, provides the basis for a claim of priority of invention under 35 U.S.C. 119(a)-(d).

BACKGROUND OF THE INVENTION

The present invention relates generally to routers.

A generic router is made known in US 2005/0079025 A1. The router includes a housing, from the underside of which a tool fitting for a milling tool connected with a drive extends. The housing is displaceably accommodated on two guide columns. To adjust the milling depth, the housing may be raised or lowered relative to a guide column using a device. The device includes a depth adjusting element, which is displaceable in the direction of a vertical axis of the router, and which interacts with a stop element.

SUMMARY OF THE INVENTION

It is therefore an object of the present invention to provide a router which is a further improvement of the existing routers.

In keeping with these objects and with others which will become apparent hereinafter, one feature of the present invention resides, briefly stated, in a router, comprising a drive motor; a milling tool connected with said drive motor; a housing; a tool fitting for a milling tool and extending from an underside of said housing; guide columns on which said housing is displaceably accommodated for adjusting a milling depth; a device for adjusting the milling depth and including a depth adjusting element that is displaceable in a direction of a vertical axis of the router using an adjusting element and that interacts with a stop element; and a device for locking said depth adjusting element, said device for locking said depth adjusting element being integrated in said device for adjusting the milling depth.

The router of the present invention has a housing, from the underside of which a tool fitting for a milling tool connected with a drive motor extends. The housing is accommodated such that it is displaceable on guide columns to adjust the milling depth. The housing includes a device for adjusting the milling depth, which includes a depth adjusting element that is displaceable in the direction of a vertical axis of the router using an adjusting element and that interacts with a stop element, and which includes a device for locking the depth adjusting element.

It is provided that the device for locking the depth adjusting element is integrated in the device for adjusting the milling depth. A design of this type results in a compact design of the router, since additional locking components—an additional locking knob, in particular—are eliminated. Locking and milling depth adjustment are combined in one region of the router in a space-saving manner.

In a further embodiment, it is provided that the device for locking the depth adjusting element and the device for adjusting the milling depth act on the depth adjusting element via an adjusting element. The adjusting element is a component of the locking device and a component of the milling depth adjusting device. The adjusting element therefore performs two functions, thereby eliminating the need for at least one more component.

It is also provided that the adjusting element is a shaft with a pinion, which meshes with the depth adjusting element, which is designed as a rack. As a result, a stepless and, therefore, rapid and accurate adjustment of the depth adjusting element and a robust, non-positive locking of the depth adjusting element are made possible.

It is also provided that the depth adjusting element is pressable against the adjusting element without play, via a spring device. As a result, the depth adjusting element is guided securely in the housing.

It is provided that the device acts on the adjusting element via a sleeve, which encloses the adjusting element and is movable in the direction of a transverse axis, and via an element that guides the sleeve in the transverse axial direction. The sleeve performs a supporting function and a locking function. Several functions are therefore combined in the sleeve, in a space-saving manner.

In a further embodiment, it is provided that the guide element is non-rotatably supported in the housing of the router, thereby resulting in stable guidance of the sleeve.

It is also provided that the guide element includes an internal thread, which interacts with an external thread on the sleeve. This ensures exact orientation of the adjusting element in the direction of the transverse axis of the router, thereby preventing the adjusting element from tilting. In addition, a small adjustment angle of the control lever results in a large displacement path of the sleeve and, therefore, the adjusting element, which results in a frictional connection between the guide element and the adjusting element that is optimal for locking the depth adjusting element.

It is also provided that the adjusting element includes a working surface, which is acted upon via the movable sleeve. Due to a design of this type, a geometrically small surface is sufficient for transferring the contact pressure, which is applied by the sleeve and is required for locking.

It is provided that the sleeve includes a control lever, which is non-rotatably connected with the sleeve. As a result, secure operation of the device for locking the depth adjusting element is made possible. The control lever is preferably connected with the sleeve such that it is non-rotatable but reversibly connectable, thereby ensuring that the control lever is always attachable to the sleeve in an easily gripped manner.

In a further embodiment, it is provided that the guide element includes a frictional inner cone, which interacts with a frictional outer cone of the adjusting element. This results in a frictional connection between the guide element and the adjusting element. Advantageously, the frictional normal force on the cone jacket is adjustable via the size of the cone angle.

It is also provided that the adjusting element is non-rotatably connected with an adjusting knob, thereby enabling good, secure operation of the device for adjusting the milling depth.

It is provided that a slip ring with a scale is rotatably supported on the adjusting knob. This ensures that an adjusted milling depth can be read with great accuracy.

The novel features of the which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
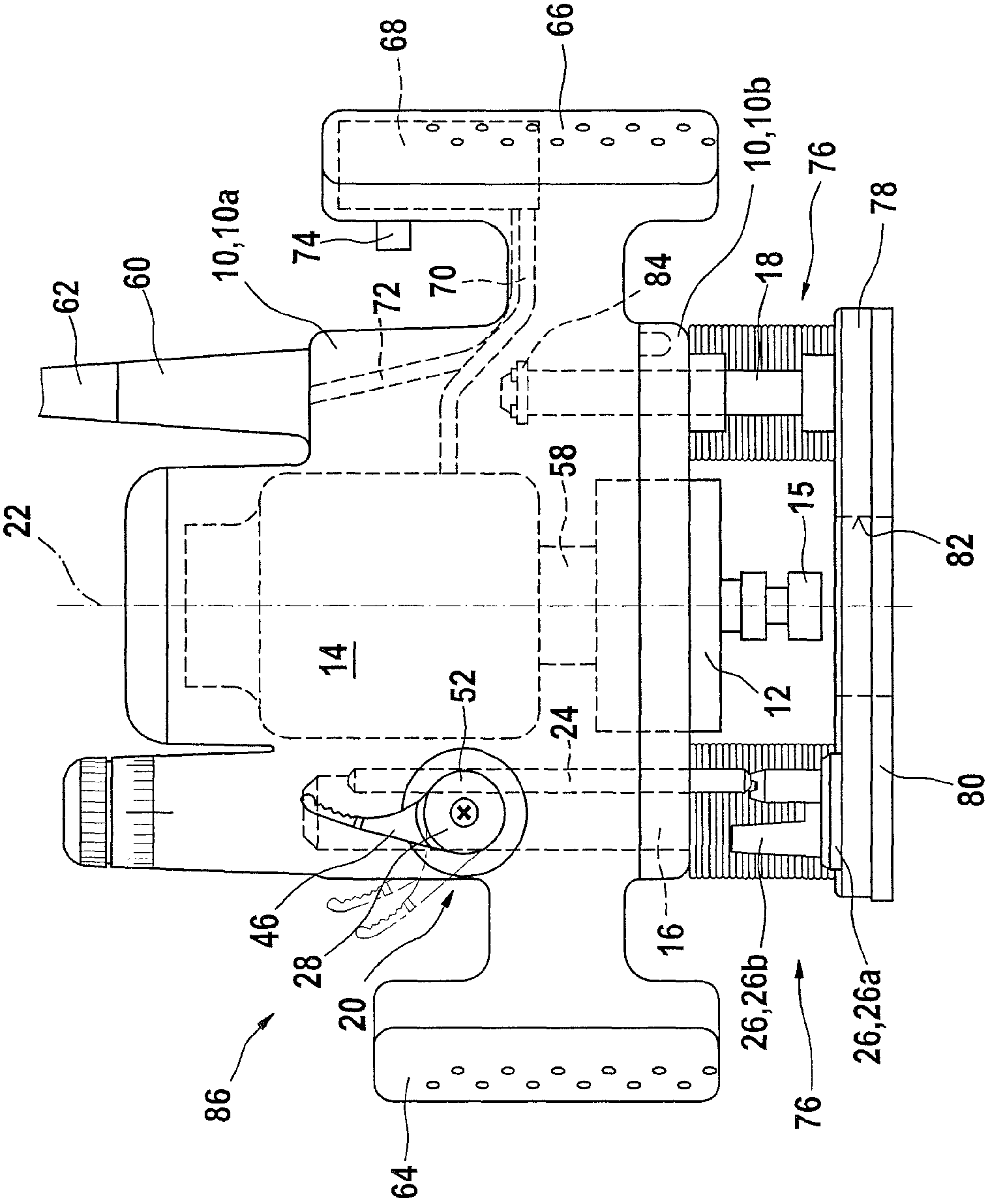
FIG. 1 shows a front view of a schematically depicted router with a device for adjusting a milling depth, and a device for locking a depth adjusting element.

FIG. 1 shows a schematically depicted, inventive router with a housing 10, which includes an upper piece 10*a*, which is preferably made of plastic, and a lower piece 10*b*, which is preferably made of aluminum. Further embodiments of housing 10, e.g., with a removable cover, are also feasible.

A drive motor 14, which starts a motor spindle 58 rotating, is located in housing 10. Motor spindle 58 is non-rotatably connected with a tool fitting 12, in which a milling tool 15 for machining a work piece is clampable. Drive motor 14 is connected with a power connection cord 62, which extends through a protective grommet 60 and out of housing 10, and which may represent the connection to a not-shown voltage source.

Housing 10 includes at least one handle 64, 66, which is fixedly connected with housing 10. In the present exemplary embodiment, the router includes two handles 64 and 66, which are diametrically opposed to each other. Handles 64, 66 are preferably integrally moulded with upper piece 10*a*.

An electrical switch 68 for connecting drive motor 14 to the voltage source and for separating drive motor 14 from the voltage source is provided in one of the two handles 64, 66, i.e., an on/off switch for drive motor 14 is provided. Switch 68 is connected via lines 70, 72 with drive motor 14 and power connection cord 62. Switch 68 for starting drive motor 14 is located inside handle 66 and includes a pushbutton 74, which is located on the outside of handle 66 and is operatively connected with switch 68.

When pushbutton 74 is depressed, switch 68 and power connection cord 62 connected to the voltage source establish the electrical connection between drive motor 14 and the voltage source in the typical manner. Pushbutton 74 is located on a side of handle 66 facing the router, so that a user of the router can operate pushbutton 74 comfortably with his thumb when he grips handle 66.

Housing 10 is height-adjustable for adjusting a milling depth, i.e., it is supported such that it is displaceable essentially parallel to a vertical axis 22 of the router and/or milling tool 15 via a guide unit 76 on a base plate 78. Base plate 78 includes a lower piece 80—which is preferably composed of plastic—for protecting the work piece to be machined. Base plate 78 and lower piece 80 have a central opening 82, into which motor spindle 58 of drive motor 14 located in housing 10 extends at least partially.

Guide unit 76 includes at least one first guide column 16 and one second guide column 18. First guide column 16, as the main column, is hollow in design, and second guide column 18, as the secondary column, is solid in design. Solid guide column 18 prevents housing 10 from rotating, and serves to limit the upper extent of the reciprocating motion. A snap ring 84 is located in an annular groove on an upper end of solid guide column 18 facing upper piece 10*a*; it prevents housing 10 from accidentally sliding off of guide columns 16, 18.

Housing 10 is detachably fixable in position relative to at least one of the guide columns 16, 18 using a locking device 86. In the present exemplary embodiment, housing 10 is detachably fixable in position relative to main column 16 using locking device 86, which is designed as a clamping device.

Figure 2:
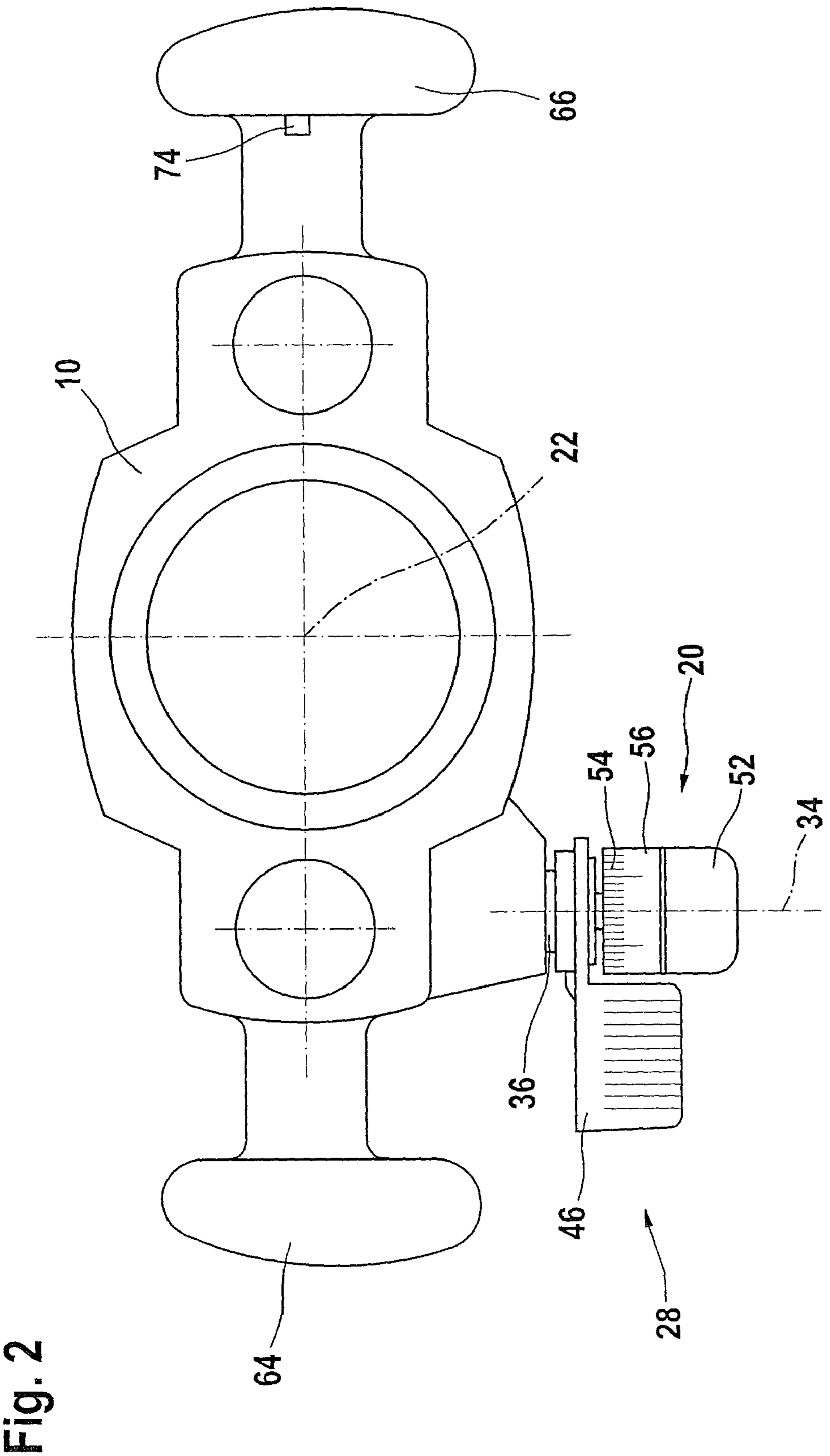
FIG. 2 shows a top view of the router with the device for adjusting the milling depth, and the device for locking the depth adjusting element.
Figure 3:
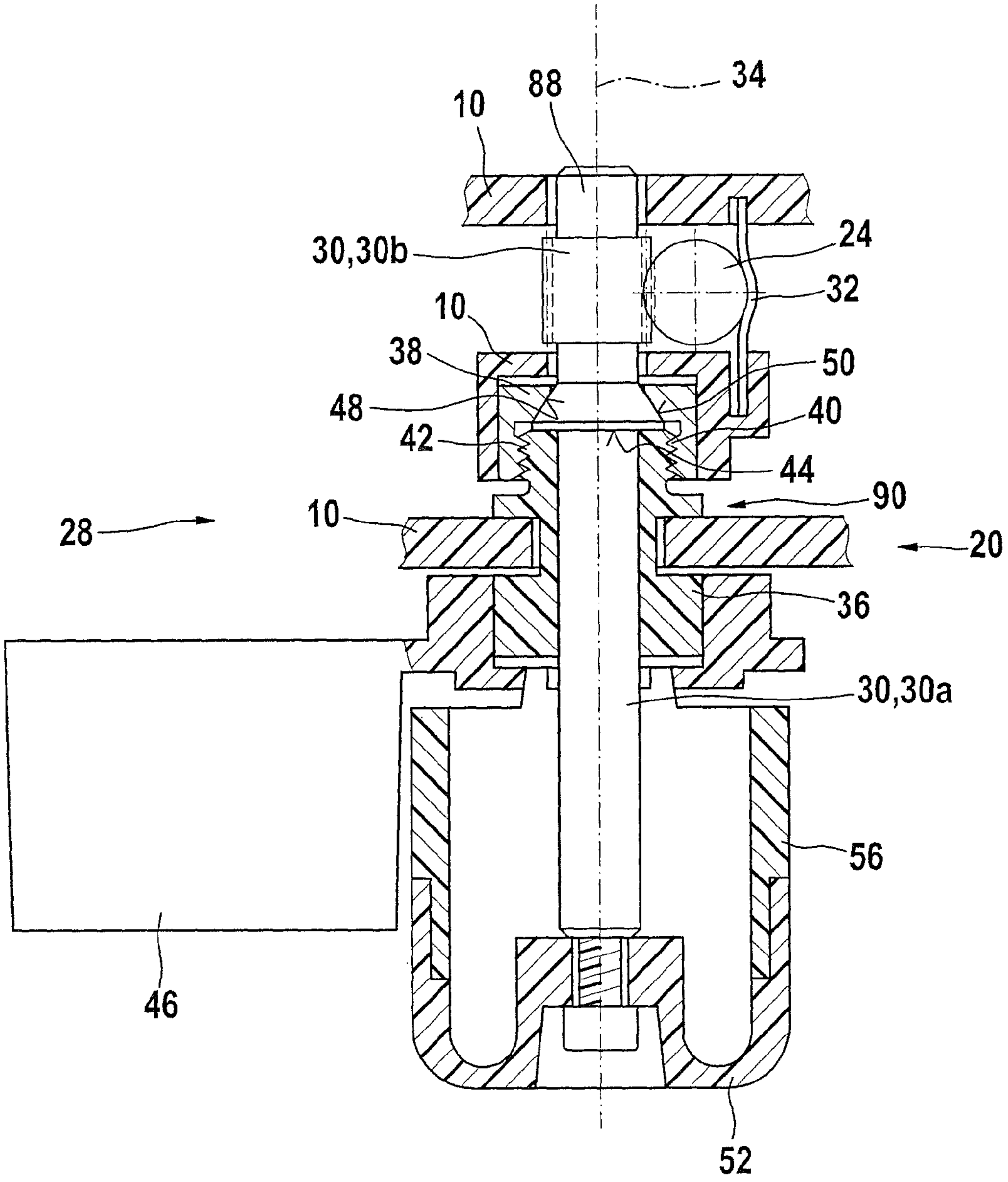
FIG. 3 shows a cross section through the device for adjusting a milling depth, and the device for locking the depth adjusting element.

According to FIGS. 2 and 3, a device 20 is provided for adjusting the milling depth, which includes a depth adjusting element 24 that is displaceable in the direction of vertical axis 22 of the router. Depth adjusting element 24 is guided in housing 10, and is displaceable in the direction of vertical axis 22 using an adjusting element 30 supported in housing 10. According to FIG. 1, a rotary plate 26*a* with three adjustable screws 26*b* is installed on base plate 78, as a stop 26 for depth adjusting element 24. Depth adjusting element 24 is detachably fixable in position using a device 28 for locking relative to housing 10.

To create a router with particularly robust, compact and accurate milling depth adjustment, it is provided according to the present invention that device 28 for locking depth adjusting element 24 is integrated in device 20 for adjusting the milling depth.

Device 28 for locking depth adjusting element 24 and device 20 for adjusting the milling depth act on depth adjusting element 24 via common adjusting element 30. Adjusting element 30 is a shaft 30*a*—which extends in the direction of a transverse axis 34 of the router—with a pinion 30*b*, which meshes in depth adjusting element 24, which is designed as a rack. Depth adjusting element 24 is pressable against adjusting element 30 and/or pinion 30*b* of adjusting element 30 without play, via a spring device 32. In the present exemplary embodiment, it is a plate spring 32, which is fixedly supported in housing 10.

Device 28 acts on adjusting element 30 via a sleeve 36, which encloses adjusting element 30 and is movable in the direction of transverse axis 34, and an element 38 that guides sleeve 36 in the direction of transverse axis 34. Adjusting element 30 is supported at an upper end 88 in housing 10 and in a central region 90 in sleeve 36, which is accommodated in housing 10. Guide element 38 is non-rotatably supported in housing 10 of the router. Guide element 38 includes an internal thread 40, which interacts with an external thread 42 on sleeve 36.

A working surface 44 is provided on adjusting element 30, which is capable of being acted upon by movable sleeve 36. Sleeve 36 includes a control lever 46, which is non-rotatably connected with sleeve 36. Control lever 46 is preferably reversibly connectable with sleeve 36. Guide element 38 includes a frictional inner cone 48, which interacts with a frictional outer cone 50 of adjusting element 30. Adjusting element 30 is non-rotatably connected with an adjusting knob 52. In the present exemplary embodiment, adjusting knob 52 is screwed onto adjusting element 30. A slip ring 56 with a scale 54 is rotatably supported on adjusting knob 52.

To adjust the milling depth, adjusting element 30 may be rotated using adjusting knob 52, so that depth adjusting element 24—which is designed as a rack—may be adjusted downwardly or upwardly in the direction of vertical axis 22 using pinion 30*b* of adjusting element 30. Preferably, a pinion 30*b* with a small diameter is selected, since this allows fine adjustments of depth adjusting element 24 to be carried out. When adjusting knob 52 is rotated, a large displacement of adjusting knob 52 via pinion 30*b* results in a small displacement of depth adjusting element 24. As a result, there is no need to perform "test" milling, remeasurements, or readjustments.

Once the desired position is reached, control lever 46, which is non-rotatably connected with sleeve 36, is rotated. As a result, sleeve 36 moves forward, i.e., toward pinion 30*b*, in the direction of transverse axis 34, by virtue of the fact that external thread 42 in sleeve 36 rotates in internal thread 40 of guide element 38. As a result, sleeve 36 acts on working surface 44 of adjusting element 30 with pressure, which causes frictional outer cone 50 of adjusting element 30 to be pressed into frictional inner cone 48 of guide element 38. A frictional connection between adjusting element 30 and guide element 38 is thereby produced. Depth adjusting element 24 is therefore locked in position via fixed adjusting element 30. The frictional normal force is adjustable via cone angle $\alpha$, according to the following formula: Frictional normal force=contact pressure/sin 30°. Accordingly, given a cone angle of 30°, the frictional normal force on the cone jacket is twice as great as the axial pressure applied by sleeve 36.

It will be understood that each of the elements described above, or two or more together, may also find a useful application in other types of constructions differing from the type described above.

While the invention has been illustrated and described as embodied in a router, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A router, comprising a drive motor;

a milling tool connected with said drive motor;

a housing;

a tool fitting for a milling tool and extending from an underside of said housing;

guide columns on which said housing is displaceably accommodated for adjusting a milling depth in a direction of a vertical axis of the router;

a device for adjusting the milling depth and including a depth adjusting element that is displaceable in a direction of the vertical axis of the router using an adjuster element and that has an end surface that interacts with a stop element to limit the milling depth; and a device for locking said depth adjusting element, said device for locking said depth adjusting element being integrated in said device for adjusting the milling depth, wherein a sleeve having an external threaded portion encloses said adjuster element, and interacts with an internal threaded portion of a guide element, and wherein the adjuster element has a frictional outer cone and the guide element has a frictional inner cone which interacts with the frictional outer cone for locking said depth adjusting element.

2. A router as defined in claim 1, wherein said devices are configured so that said device for locking said depth adjusting element and said device for adjusting the milling depth act on said depth adjusting element via said adjuster element.

3. A router as defined in claim 1, wherein said depth adjusting element is configured as a rack, and said adjuster element is configured as a shaft with a pinion that meshes with said depth adjusting element.

4. A router as defined in claim 1; and further comprising a spring device configured so that said depth adjusting element is pressable against said adjuster element without play, using said spring device.

5. A router as defined in claim 1; wherein said sleeve which encloses said adjuster element is movable in a direction of an axis that is transverse axis relative to the vertical axis of the router so that said device for locking the depth adjusting element acts via said sleeve; and wherein the guide element guides said sleeve in the direction of said transverse axis and acts on said adjuster element.

6. A router as defined in claim 5, wherein said guide element that guides said sleeve and acts on said adjuster element is non-rotatably supported in said housing.

7. A router as defined in claim 1, and further comprising a base plate, wherein the housing is movable relative to the base plate to adjust the milling depth.

8. A router as defined in claim 1, wherein said adjuster element has a working surface; and wherein said sleeve acts upon said working surface of said adjuster element.

9. A router as defined in claim 1; and further comprising a control lever which is non-rotatably connected with said sleeve.

10. A router as defined in claim 1, wherein rotation of the external threaded portion relative to the internal threaded portion results in movement of the sleeve along an axis transverse relative to the vertical axis of the router.

11. A router as defined in claim 1; and further comprising an adjusting knob, said adjuster element being non-rotatably connected with said adjusting knob.

12. A router as defined in claim 11; and further comprising a slip ring provided with a scale and rotatably supported on said adjusting knob.

* * * * *